United States Patent
Wu et al.

(10) Patent No.: US 9,673,691 B2
(45) Date of Patent: Jun. 6, 2017

(54) ENERGY BALANCE CONTROLLER OF ELECTRONIC POWER CONVERTER AND ENERGY BALANCE CONTROL METHOD

(71) Applicant: SOUTH CHINA UNIVERSITY OF TECHNOLOGY, Guangzhou, Guangdong Province (CN)

(72) Inventors: Qinghua Wu, Guangzhou (CN); Lei Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/030,191

(22) PCT Filed: Dec. 23, 2013

(86) PCT No.: PCT/CN2013/090197
§ 371 (c)(1),
(2) Date: Apr. 18, 2016

(87) PCT Pub. No.: WO2015/054957
PCT Pub. Date: Apr. 23, 2015

(65) Prior Publication Data
US 2016/0254739 A1 Sep. 1, 2016

(30) Foreign Application Priority Data
Oct. 16, 2013 (CN) .......................... 2013 1 0485088

(51) Int. Cl.
*G05F 1/00* (2006.01)
*H02M 1/00* (2006.01)
(Continued)

(52) U.S. Cl.
CPC ........... *H02M 1/00* (2013.01); *H02M 3/1563* (2013.01); *H02M 3/156* (2013.01); *H02M 3/157* (2013.01);
(Continued)

(58) Field of Classification Search
CPC .. Y02B 70/126; H02M 3/156; H02M 3/1588; H02M 3/157; G05F 1/67
(Continued)

(56) References Cited

U.S. PATENT DOCUMENTS 5,804,950 A * 9/1998 Hwang ............... H02M 1/4225
323/222
6,420,858 B1 7/2002 Kitagawa et al.
(Continued)

FOREIGN PATENT DOCUMENTS

| CN | 101217251 A | 7/2008 |
|----|-------------|--------|
| CN | 101800474 A | 8/2010 |
| CN | 102931819 A | 2/2013 |

OTHER PUBLICATIONS

Jul. 1, 2014 International Search Report issued in International Patent Application No. PCT/CN2013/090197.
(Continued)

*Primary Examiner* — Nguyen Tran
(74) *Attorney, Agent, or Firm* — Oliff PLC

(57) ABSTRACT

An energy balance controller includes a detection unit, a calculation unit and a reset integral module; the reset integral module includes a reset integrator, a comparator and an RS flip-flop; the input terminals of the calculation unit and the reset integrator are connected to the output terminal of the detection unit, respectively; the output terminal of the calculation unit is connected to one input terminal of the comparator, and the output terminal of the reset integrator is connected to the other input terminal of the comparator; the output terminal of the comparator is connected to the reset terminal of the RS flip-flop; the $\overline{Q}$ terminal of the RS flip-flop is connected to the reset integrator, and the Q terminal of the RS flip-flop is used for controlling a switch-
(Continued)

ing device of the converter to switch on or off; the method is implemented by the energy balance controller.

6 Claims, 10 Drawing Sheets

(51) Int. Cl.
*H02M 3/156* (2006.01)
*H02M 3/157* (2006.01)

(52) U.S. Cl.
CPC ............... *H02M 2001/0009* (2013.01); *H02M 2003/1566* (2013.01)

(58) Field of Classification Search
USPC ................. 323/207, 222, 271, 282–285, 299
See application file for complete search history.

(56) References Cited

U.S. PATENT DOCUMENTS

| | | | |
|---|---|---|---|
| 8,482,942 B2* | 7/2013 | Choi | H02M 1/4208 363/125 |
| 2010/0308654 A1 | 12/2010 | Chen | |
| 2015/0035510 A1* | 2/2015 | Hoshino | H02M 3/157 323/283 |

OTHER PUBLICATIONS

Jul. 1, 2014 Written Opinion issued in International Patent Application No. PCT/CN2013/090197.

* cited by examiner

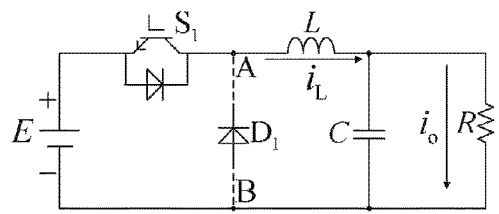
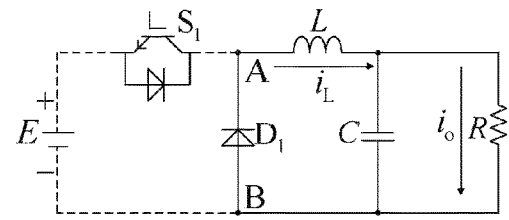
Fig. 1a                Fig. 1b
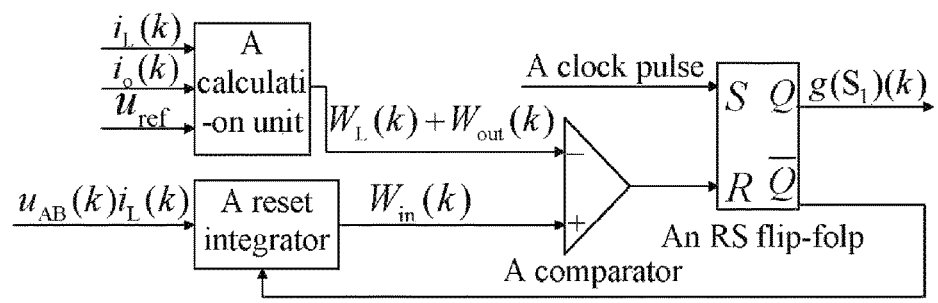
Fig. 2
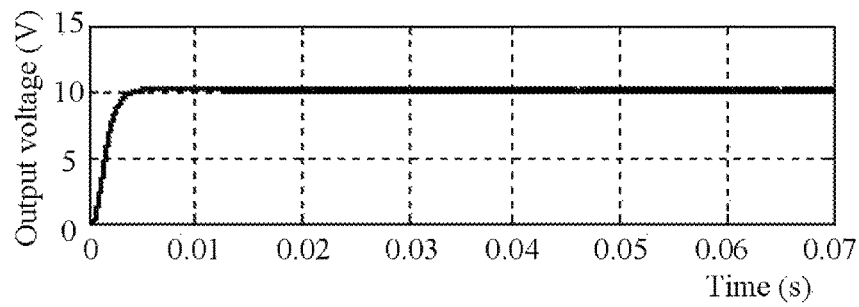
Fig. 3a

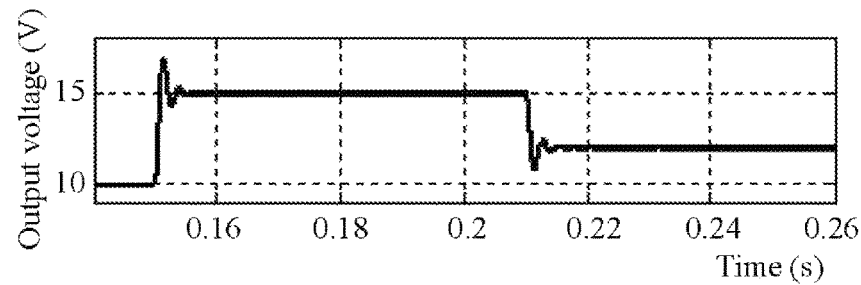
Fig. 6c
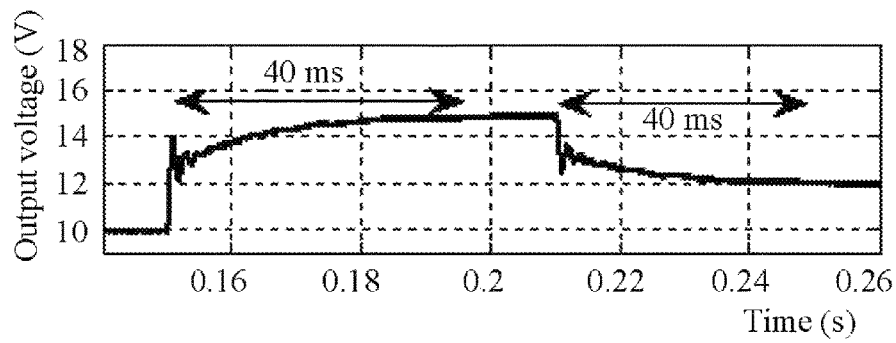
Fig. 6d
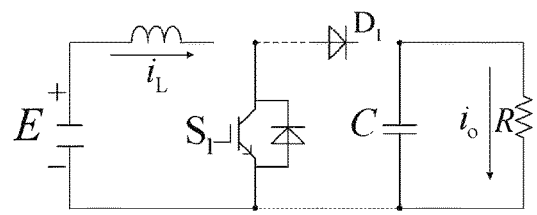 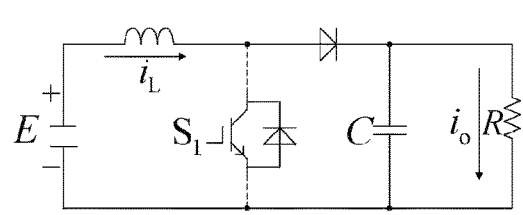
Fig. 7a                                    Fig. 7b

ENERGY BALANCE CONTROLLER OF ELECTRONIC POWER CONVERTER AND ENERGY BALANCE CONTROL METHOD

FIELD OF THE INVENTION

The present invention relates to an energy balance controller of an electronic power converter and an energy balance control method of the same, particularly to an energy balance controller of an electronic power DC-DC converter, and an electronic power DC-AC and AC-DC converter, as well as an energy balance control method of the same, which belong to the field of nonlinear control of the electronic power converter.

BACKGROUND OF THE INVENTION

With development of the DC transmission and the renewable energy access grid technology in the world, an electronic power converter is applied more and more widely in the power system, with the continuous extension of application putting forward higher requirements for stable and dynamic performances of the converter. The traditional linear PID and PI controls cannot meet the requirements for the fast dynamic performance of the converter because of their characteristics of unclear control principle, complicated parameter setting and poor dynamic performance, wherein the traditional linear PID control has the following main problems:

1) The principle of the traditional PID control is as follows: The error of the given and feedback values is operated upon proportionally, integrally and differentially, and the resulting error value is compared with a triangle wave, thus obtaining a PWM signal of the switching device, with the output voltage adjusted by adjusting the pulse width of the PWM signal in each cycle. Thereby a modulation error is inevitably produced, resulting in a large waveform distortion as a direct result. Besides, lack of the mathematical derivation makes it impossible to know how PID works in the control process, which results in unclear control principle and inconvenient error investigation.

2) With design of the PID controller relying on precise mathematical model of the control system, typically the PID parameters are complicated to adjust and mostly set according to experience, which cannot guarantee optimality of the parameters; besides, lack of the self-setting capacity makes the PID parameters have to be constantly reset with the change of the control system parameters.

3) Improvement of efficiency and dynamic performance has become the development trend of the converter, while the strong coupling and nonlinear characteristics of the converter disenable the traditional linear feedback control to achieve satisfactory results, especially dynamic response and robustness, due to restrictions on bandwidth and feedback delay.

In addition, in the electronic power converters, due to the shortcoming of a traditional inverter that it has a through bridge arm and cannot be boosted, some researchers do research and make practical application design on a DC-DC combined inverter in recent years. The research shows that such a new combined inverter can achieve higher stable-state accuracy, a work approach more easily to be controlled, and also a more stable inverter system. With widely application of this inverter, research on the performance improvement of the DC-DC converter becomes more meaningful.

In the disclosed patent documents, there is no method yet of improving the dynamic performance of the converter from the control approach. In the disclosed journals and conference papers, many researchers conducted wide research on how to improve the dynamic response of the converter and the capacity of inhibiting interference and even jump of the input voltage and load current, and proposed a number of methods and achieved certain results, but these methods still have certain problems.

It was proposed in the literature to improve the dynamic response of the converter by adding a compensation circuit, which reduces the output voltage drop and shortens the dynamic response time to some extent, but needs an additional circuit and increases complexity of the converter. It was also proposed in the literature to shorten the dynamic response time of the converter by the digital control method "static model reference"; however, the research shows that the "static model reference" is more suitable for eliminating a stable-state error, and has an unobvious result in a dynamic process. It was also proposed in the literature to improve the dynamic response of the converter by keeping the charge-discharge balance of a capacitor; however, calculation of charging and discharging the capacitor is relatively complicated and has high accuracy requirements. Besides, an energy pulse modulation mode was also proposed in the literature, wherein by calculating the energy needed by the converter, the energy stored in an inductor is made to be able to provide the energy needed by the converter so as to attain the purpose of controlling the converter; however, the continuous current mode (CCM) and the discontinuous current mode (DCM) of the inductor need to be judged and controlled in the control process, respectively, in CCM the control derivation is more complicated because the inductor has some initial energy, and this method is only applicable to the Buck-Boost converter and the combined circuit thereof and needs to consider the initial energy of the inductor in other circuits such as Buck and Boost circuits, which will make the control derivation very complicated.

Besides, there are also some methods that improve the dynamic performance without sacrificing the stable-state accuracy by using two different control approaches in the stable state and transient state. Although these methods are effective, they are not easy to implement due to two sets of controllers used in the system, with smooth transition between the two sets of controllers being a huge challenge.

Therefore, it has become an important subject of the current research to provide a precise mathematical model having clear control principle and not relying on the control system, and a control approach having stronger robustness, faster dynamic response and good capacity of inhibiting disturbance of the input voltage and load.

CONTENTS OF THE INVENTION

In order to solve the above-mentioned deficiencies of the prior art, a purpose of the present invention is to provide an energy balance controller of an electronic power converter that has simple structure, wide application scope, fast dynamic response, and strong capacity of inhibiting interference and even jump of the input voltage and load current.

The other purpose of the present invention is to provide an energy balance control method of the electronic power converter based on the above energy balance controller.

The purposes of the present invention can be achieved through the follow technical solution:

An energy balance controller of a power electronic converter, characterized in that: the energy balance controller comprises a detection unit, a calculation unit and a reset integral module; the reset integral module includes a reset integrator, a comparator and an RS flip-flop; the input terminals of the calculation unit and the reset integrator are connected to the output terminal of the detection unit, respectively; the output terminal of the calculation unit is connected to one input terminal of the comparator, and the output terminal of the reset integrator is connected to the other input terminal of the comparator; the output terminal of the comparator is connected to the reset terminal of the RS flip-flop; the $\overline{Q}$ terminal of the RS flip-flop is connected to the reset integrator, and the Q terminal of the RS flip-flop is used for controlling a switching device of the converter to switch on or off; wherein:

the detection unit is used in the detection unit for detecting inductor current, input voltage and output current of the converter, sending an inductor current signal and an output current signal to the calculation unit, and sends the inductor current signal and an input voltage signal to the reset integrator;

the calculation unit is used for receiving the inductor current signal and the output current signal of the detection unit, calculating the sum of the energy stored in an inductor and the output energy according to the inductor current, the output current and the given voltage, and sending the calculation result to an input terminal of the comparator;

the reset integrator is used for receiving an inductor current signal and an input voltage signal of the detection unit, integrating the product of the inductor current and the input voltage, and sending the integral result to the other input terminal of the comparator; and the comparator is used for comparing and judging the output results of the reset integrator and the calculation unit, and sending the judgment result to a reset terminal of the RS flip-flop.

Preferably, the detection unit comprises:

a current sensor, used for detecting the inductor current and the output current of the converter; and a voltage sensor, used for detecting the input voltage of the converter.

Preferably, the converter is a DC-DC converter, an AC-DC converter or a DC-AC converter.

The other purpose of the present invention can be achieved through the follow technical solution:

An energy balance control method of the power electronic converter, characterized in that the energy balance control method comprises the following steps:

1) the detection unit detects the inductor current, the input voltage and the output current of the converter, sends the inductor current signal and the output current signal to the calculation unit, and sends the inductor current signal and the input voltage signal to the reset integrator;

2) the calculation unit calculates the sum of the energy stored in the inductor and the output energy according to the energy balance control principle by making use of the inductor current, the output current and the given voltage, and sends the calculation result to an input terminal of the comparator, with the output result of the reset integrator at this point being zero;

3) when a clock pulse arrives, it triggers the RS flip-flop, and controls a switching device of the converter to switch on through the Q terminal of the RS flip-flop; the reset integrator integrates the product of the inductor current and the input voltage, and sends the integral result to the other input terminal of the comparator; and 4) the comparator compares and judges the output results of the reset integrator and the calculation unit; when the output result of the reset integrator is greater than or equal to the output result of the calculation unit, the judgment result is sent to the reset terminal of the RS flip-flop, and $\overline{Q}$ terminal of the RS flip-flop generates a reset pulse signal to reset the reset integrator; here the Q terminal of the RS flip-flop is used to control the switching device of the converter to switch off, and the output result of the reset integrator is kept at zero until a next clock pulse arrives.

Preferably, the energy balance control principle is shown by the following formula:

$$W_{in}=W_L+W_{out}$$

wherein $W_{in}$ is the energy inputted into a converter circuit, $W_L$ is the energy stored in an inductor L, and $W_{out}$ is the energy outputted by the converter circuit.

The present invention has the following beneficial effects relative to the prior art:

1. The energy balance controller of the present invention has clear control principle, is easy to achieve, is applicable to the continuous current mode (CCM) and the discontinuous current mode (DCM) of the inductor of the DC-DC converter, can achieve fast dynamic response without an additional device, and has strong capacity of inhibiting interference and even jump of the input voltage and load current.

2. The energy balance controller of the present invention overcomes complexity of the PI parameter setting, and the controller has the self-adjustment capacity for the change of the system parameters.

3. The energy balance controller of the present invention uses nonlinear control that, compared to the traditional PI control, not only has the capacity of accurately adjusting voltage in the stable state, but also has the strong capacity of inhibiting disturbance and even jump of the input voltage and load, as well as the capacity of rapidly responding and tracking the given voltage.

4. The control approach of the energy balance controller of the present invention is likewise applicable to controlling the DC-AC converter and the AC-DC converter and, when used to control the DC-AC and AC-DC converter, has the stronger capacity of adjusting the nonlinear load than the traditional PI control.

BRIEF DESCRIPTION OF THE DRAWINGS

FIG. 1a is a schematic diagram of a circuit of the work mode 1 of the Buck converter; and FIG. 1b is a schematic diagram of a circuit of the work mode 2 of the Buck converter.

FIG. 2 is a block diagram of the structure of the energy balance controller of the Buck converter.

FIG. 3a is a schematic diagram of the initial dynamic response of the Buck converter based on the energy balance control.

FIG. 6c is a waveform diagram of the output voltage during the given voltage jump of the Buck converter based on the single-cycle control; and FIG. 6d is a waveform diagram of the output voltage during the given voltage jump of the Buck converter based on the PI control.

FIG. 7a is a schematic diagram of a circuit of the work mode 1 of the Boost converter; and FIG. 7b is a schematic diagram of a circuit of the work mode 2 of the Boost converter.

DETAILED DESCRIPTION OF THE EMBODIMENTS

Example 1

Figure 3B:
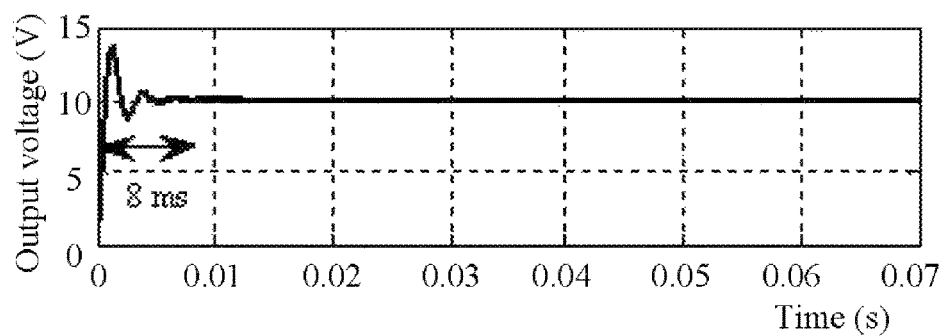
FIG. 3b is a schematic diagram of the initial dynamic response of the Buck converter based on the single-cycle control.

This example takes the Buck converter as an example.

The energy balance control principle of the DC-DC converter: The DC-DC converter, mainly composed of an inductor, a capacitor and a load, has the following energy balance control principle: In each switching cycle $T_s$, the energy $W_{in}$ inputted into the circuit is equal to the sum of the energy $W_{out}$ consumed by the circuit load (i.e. the output energy of the circuit), the energy $W_L$ stored in the inductor L, the energy $W_c$ in the capacitor C and the energy consumed by the respective components in the circuit. Compared with the energy consumed by load and stored in the energy storage component, the energy consumed by the respective components in the circuit can be neglected, and thus the energy balance control principle can be expressed as follows: $W_{in}=W_L+W_c+W_{out}$. $W_c$ is obtained from the integral formula $W_c=\int_0^{T_s} u_c i_c dt$, wherein $u_c$ is the voltage across the capacitor, $i_c$ is the capacitor current, and $i_c$ can be expressed as $$i_c = C\left(\frac{du_c}{dt}\right)$$

With the control purpose of the DC-DC converter being to make the output voltage $u_o$ equal to the given voltage $u_{ref}$, if the capacitor voltage $u_c$ (equal to the output voltage $u_o$) is assumed to be always equal to the given voltage $u_{ref}$, then $$i_c = C\left(\frac{du_c}{dt}\right) = 0 \Rightarrow W_c = 0$$

Therefore, $W_c$ can be neglected. Then the energy balance control principle can be transformed into the following formula:

$$W_{in}=W_L+W_{out} \qquad (1)$$

The energy balance control method of the Buck converter is as follows:

As shown in FIGS. 1a-1b are two work modes in one cycle of the Buck converter; wherein $i_L$ is the inductor current, $i_o$ is the output current (i.e. the current of the load R). With $T_s$ as the switching cycle, the Buck circuit works in two modes in one switching cycle by taking the $k^{th}$ switching cycle as an example: The duration in which the switch $S_1$ is on is $T_{on}(k)$, and the duration in which the switch $S_1$ is off is $T_s-T_{on}(k)$.

The work mode 1: The switch $S_1$ is on, the DC power supply inputs energy into the circuit, and the inductor current $i_L$ flows through the loop (E→$S_1$→L→C→R) in the direction as shown in FIG. 1a, with the switching state here as follows:

$$u_{AB}(k)=E$$

$$W_{in}(k)=\int_0^{T_{on}(k)} u_{AB}(k) i_L(k) dt = \int_0^{T_{on}(k)} E i_L(k) dt$$

The work mode 2: The switch $S_1$ is off, the energy stops to be inputted into the circuit, the direction of the inductor current $i_L$ is as shown in FIG. 1b, and the continuous current of the diode $D_1$ flows through the load R, with the switching state here as follows:

$$u_{AB}(k)=0$$

$$W_{in}(k)=\int_{T_{on}(k)}^{T_s} u_{AB}(k) i_L(k) dt = 0$$

In the $k^{th}$ switching cycle, $W_{in}(k)$, $W_{out}(k)$ and $W_L(k)$ can be obtained from the work modes 1 and 2; according to the energy balance control principle shown by the formula (1), in order to keep the energy balance, there are the following formulas:

$$W_{in}(k) = W_L(k) + W_{out}(k) \qquad (2)$$

-continued $$\int_0^{T_{on}(k)} Ei_L(k)dt = u_L(k)i_L(k)T_s + u_{ref}i_o(k)T_s$$

$u_L(k)i_L(k)T_s + u_{ref}i_o(k)T_s$ is represented by $W_{dm}$, that is:

$$W_{dm} = u_L(k)i_L(k)T_s + u_{ref}i_o(k)T_s$$

Therefore, in order to keep the energy balance, the switch $S_1$ is on in the $k^{th}$ switching cycle, and the DC power supply inputs energy into the circuit, until $$\int_0^{T_{on}(k)} Ei_L(k)dt \geq W_{dm}$$

The energy balance controller of this example includes a detection unit, a calculation unit and a reset integral module; the reset integral module includes a reset integrator, a comparator and an RS flip-flop; the detection unit is used for detecting the inductor current $i_L(k)$ of the Buck converter, the current $i_o(k)$ of the load R and the voltage $u_{AB}(k)$ across the AB terminals, and sending them to the calculation unit and the reset integral module; the calculation unit is used for receiving the information sent out by the detection unit and calculating to obtain $W_{dm}$, and sending the calculation result to an input terminal of the comparator; the reset integrator integrates the product $u_{AB}(k)i_L(k)$ of the inductor current $i_L(k)$ and the voltage $u_{AB}(k)$ across the AB terminals, and sends the integral result to the other input terminal of the comparator; the comparator compares the output results of the reset integrator and the calculation unit, and sends the judgment result to the reset terminal (the R terminal) of the RS flip-flop; the $\overline{Q}$ terminal of the RS flip-flop provides a reset signal for the reset integrator, with the Q terminal of the RS flip-flop as the control-signal output terminal.

As shown in FIG. 2, the energy balance control principle of this example is as follows: When a cycle begins, such as the $k^{th}$ switching cycle, first the calculation unit receives the information of the detection unit to calculate the value of $W_{dm}$, with the output result of the reset integrator at this point being zero; when a clock pulse arrives, it triggers the RS flip-flop, making Q=1 and controlling the switch $S_1$ to switch on, and the Buck converter is in the work mode 1, with here the DC power supply inputting energy into the circuit; meanwhile, the reset integrator integrates $u_{AB}(k)i_L(k)$, with its output value starting to rise monotonically from the initial value. When the output value of the reset integrator is greater than or equal to the value of $W_{dm}$, the $\overline{Q}$ terminal of the comparator will produce a reset pulse signal to make the reset integrator reset, and here $\overline{Q}$=1 and Q=0, and the switch $S_1$ is controlled to switch off; in this switching state, the Buck converter is in the work mode 2, and here $u_{AB}(k)$=0, the energy stops to be inputted into the circuit, and the output result of the reset integrator is kept at zero until a next clock pulse arrives.

The above energy balance control method implemented with the energy balance controller will be further described with reference to FIGS. 3a-3c, FIGS. 4a-4d, FIGS. 5a-5d and FIGS. 6a-6d.

Simulation parameters of the Buck circuit: L=500 uH, C=330 uF, $f_s$=10 KHz, E=25 V, $u_{ref}$=10 V. In order to prove the advantages of the energy balance controller of this example, a PI controller and a single-cycle controller are selected for comparison. Wherein the PI controller is designed to have a phase margin of 76.6° and a cutoff frequency of 2400 Hz.

Figure 3C:
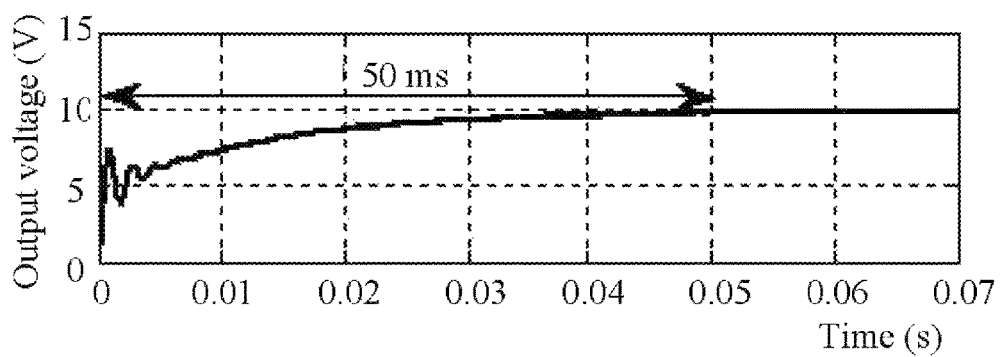
FIG. 3c is a schematic diagram of the initial dynamic response of the Buck converter based on the PI control.
Figure 4A:
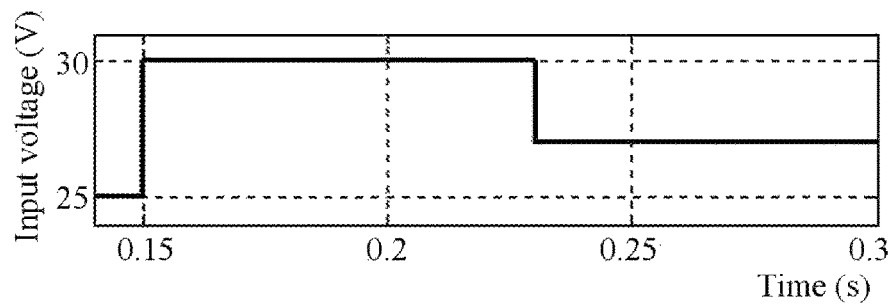
FIG. 4a is a waveform diagram of the input voltage jump 25V→30V→27V of the Buck converter.
Figure 4B:
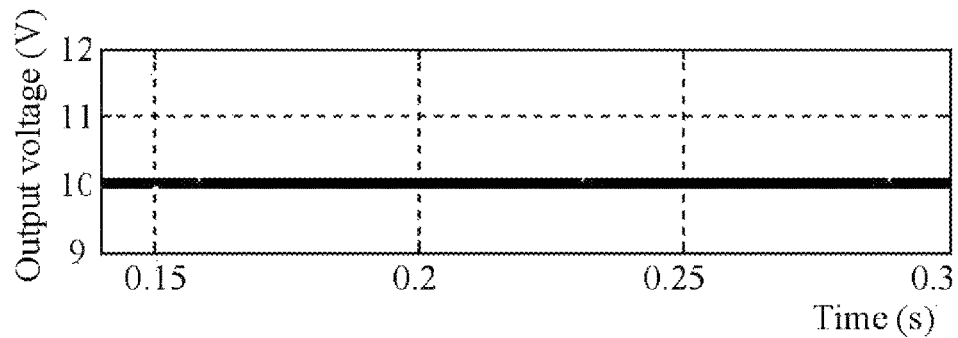
FIG. 4b is a waveform diagram of the output voltage during the input voltage jump of the Buck converter based on the energy balance control.
Figure 4C:
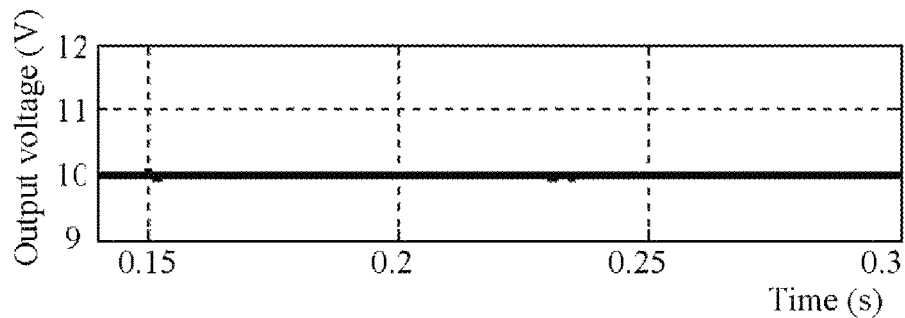
FIG. 4c is a waveform diagram of the output voltage during the input voltage jump of the Buck converter based on the single-cycle control.
Figure 4D:
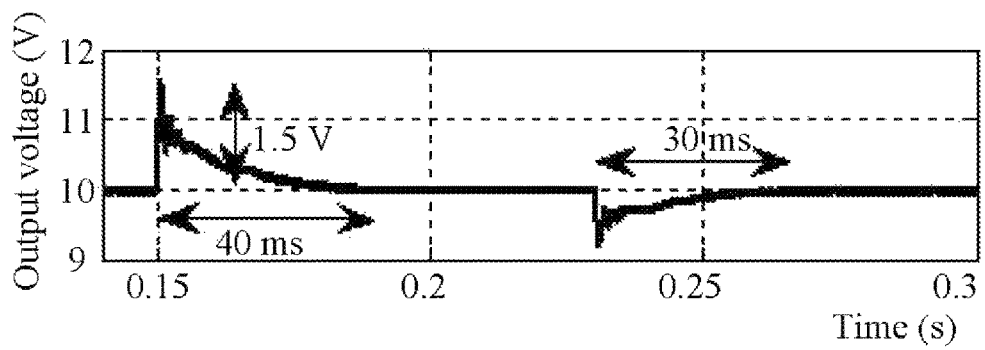
FIG. 4d is a waveform diagram of the output voltage during the input voltage jump of the Buck converter based on the PI control.

In FIGS. 3a-3c can be seen the dynamic response of the Buck converter from the initial value to the stable state, wherein the output voltage of the Buck converter based on the energy balance control can quickly reach the stable state within 4 ms almost without overshoot; the output voltage of the Buck converter based on the single-cycle control needs longer time to reach the stable state and has overshoot of 3 V; for the dynamic response of the Buck converter based on the PI control, it can be seen that the output voltage needs the response time more than 50 ms to reach the stable state.

In FIGS. 4a-4d can be seen the dynamic response of the output voltage of the Buck converter during the input voltage jump 25V→30V→27V; wherein it can be known by comparing the output voltage waveform of the Buck converter based on the energy balance control with the output voltage waveform of the Buck converter based on the PI control that, when the input voltage jumps, the output voltage of the Buck converter based on the energy balance control has no obvious dynamic adjustment process, indicating that the energy balance control has the capacity of completely inhibiting interference or jump of the input voltage. While the Buck converter based on the PI control has overshoot greater than 1.5 V when the input voltage jumps upward (25 V→30 V), and has the dynamic response time longer than 40 ms; it has overshoot greater than 0.8 V when the input voltage jumps downward (30 V→27 V), and has the dynamic response time longer than 30 ms; obviously, the energy balance control has stronger capacity of inhibiting interference and even jump of the input voltage; it can be seen from FIG. 4c that the single-cycle control also has strong capacity of inhibiting jump of the input voltage.

Figure 5A:
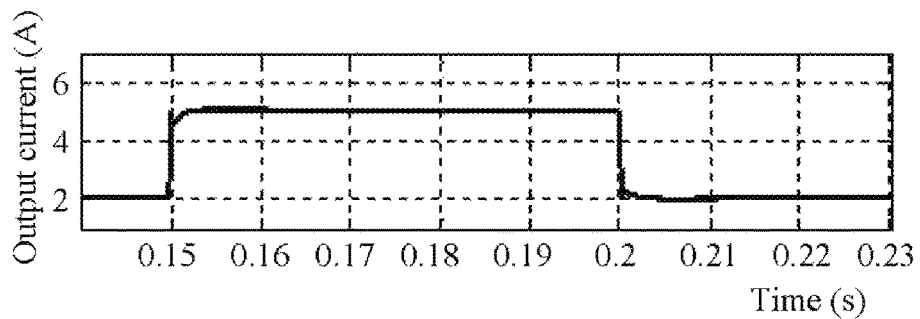
FIG. 5a is a waveform diagram of the Buck converter that makes the load current jump by changing the load resistance 2Ω→5Ω→2Ω.
Figure 5B:
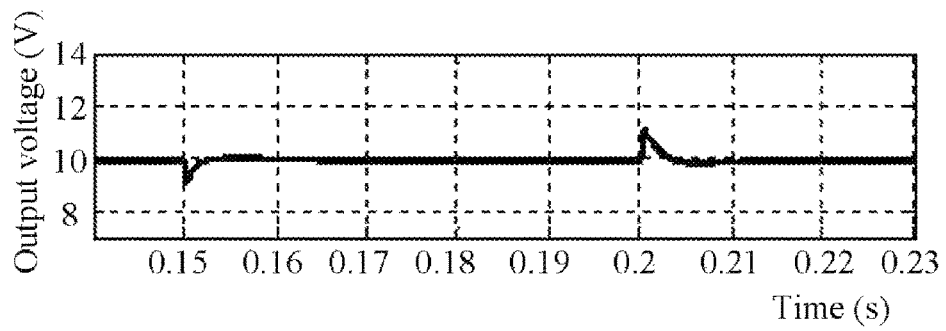
FIG. 5b is a waveform diagram of the output voltage during the load current jump of the Buck converter based on the energy balance control.
Figure 5C:
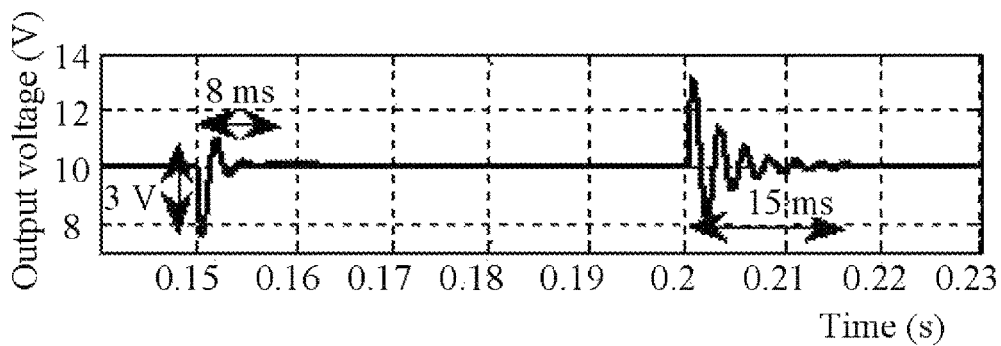
FIG. 5c is a waveform diagram of the output voltage during the load current jump of the Buck converter based on the single-cycle control.
Figure 5D:
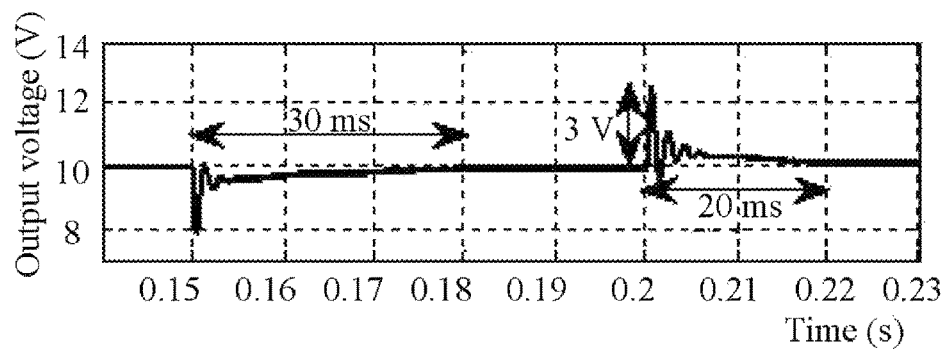
FIG. 5d is a waveform diagram of the output voltage during the load current jump of the Buck converter based on the PI control.
Figure 6A:
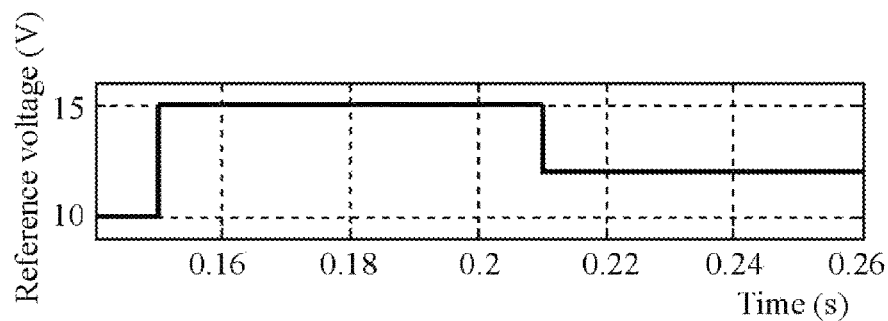
FIG. 6a is a waveform diagram of the given voltage jump 10V→15V→12V of the Buck converter.
Figure 6B:
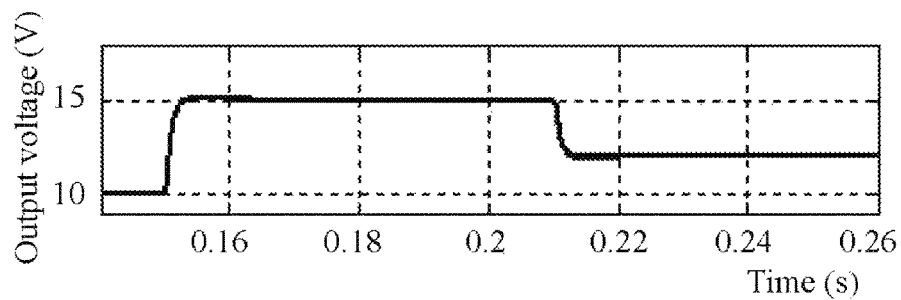
FIG. 6b is a waveform diagram of the output voltage during the given voltage jump of the Buck converter based on the energy balance control.
Figure 8A:
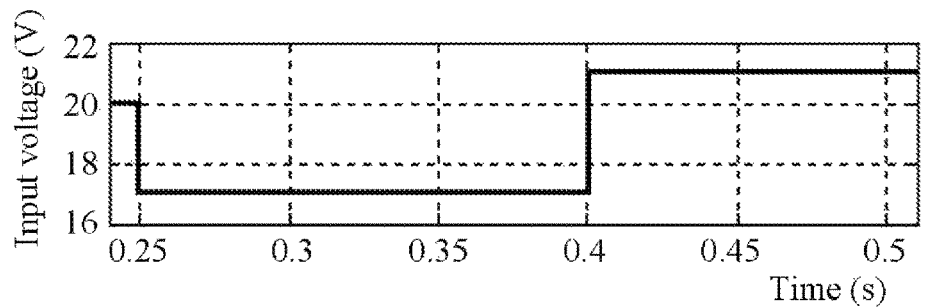
FIG. 8a is a waveform diagram of the input voltage jump 20V→17V→21V of the Boost converter.
Figure 8B:
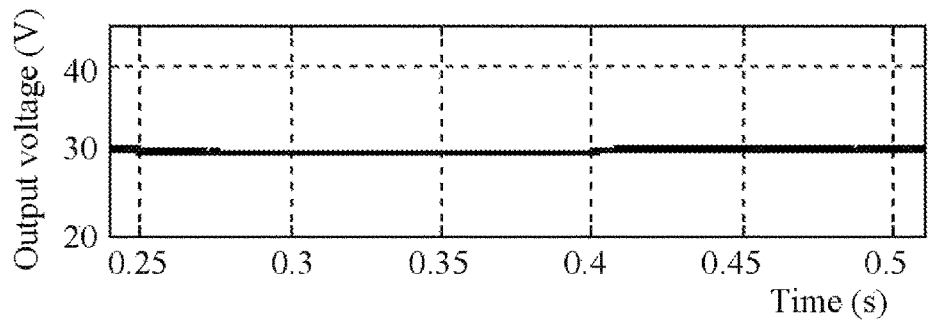
FIG. 8b is a waveform diagram of the output voltage during the input voltage jump of the Boost converter based on the energy balance control.
Figure 8C:
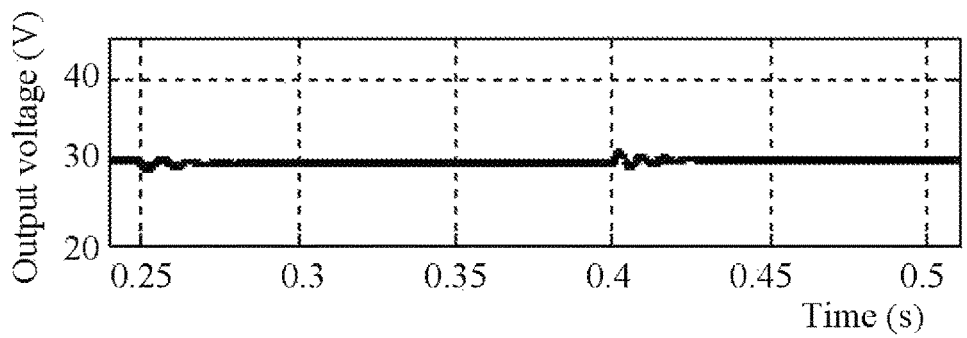
FIG. 8c is a waveform diagram of the output voltage during the input voltage jump of the Boost converter based on the single-cycle control.
Figure 8D:
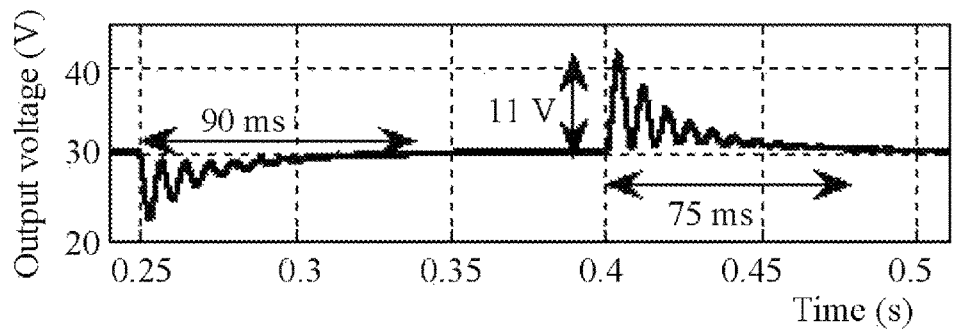
FIG. 8d is a waveform diagram of the output voltage during the input voltage jump of the Boost converter based on the PI control.

In FIGS. 5a-5d can be seen the dynamic response of the Buck converter when the load current jumps (realized by changing the load resistance 2Ω→5Ω→2Ω); when the load current jumps, the Buck converter based on the energy balance control, compared with the Buck converter based on the PI control, has the output voltage overshoot reduced from 3 V to 1 V, and also has the greatly reduced dynamic response time; while the output voltage response of the Buck converter based on the single-cycle control has the dynamic response time of 15 ms and overshoot up to 5 V; obviously, the single-cycle control does not improve the dynamic response capacity of the output voltage to the load jump; the simulation results in FIGS. 5b-5d show that, the single-cycle control, being the same with the PI control, has weak capacity of inhibiting the load current jump, while the energy balance control has strong capacity of inhibiting interference and even jump of the load current.

In order to verify the capacity of the output voltage following the given voltage, in FIGS. 6a-6d can be seen the dynamic response of the Buck converter when the given voltage jumps (10 V→15 V→12 V); when the given voltage jumps, the output voltage of the Buck converter based on the energy balance control can quickly follow the given voltage to change, which indicates that the energy balance control has the strong capacity of following the given voltage; while the Buck converter based on the single-cycle control, although being able to follow the given voltage in the short period of time, has very great overshoot; when the given voltage jumps, the Buck converter based on the PI control needs the dynamic adjustment time up to 40 ms to reach the new stable state.

Example 2

This example takes the Boost converter as an example.
The energy balance control method of the Boost converter is as follows:
As shown in FIGS. 7a-7b are two work modes in one cycle of the Boost converter.

The work mode 1: The switch $S_1$ is on, the DC power supply inputs energy into the circuit, and the Boost converter circuit is divided into two parts: the inductor current $i_L$ flows through the loop (E→L→$S_1$) in the direction as shown in FIG. 7a, while the capacitor C provides energy to the load R in this switching state:

$$i_L(k) \neq i_o(k)$$

$$W_{in}(k) = \int_0^{T_{on}(k)} Ei_L(k)dt$$

The work mode 2: The switch $S_1$ is off, the energy continues to be inputted into the circuit, while the inductor current $i_L$ flows through the loop (E→L→$D_1$→C→R) in the direction as shown in FIG. 7b, with the switching state here as follows:

$$i_L(k) = i_o(k)$$

$$W_{in}(k) = \int_{T_{on}(k)}^{T_s} Ei_o(k)dt$$

In the $k^{th}$ switching cycle, $W_{in}(k)$, $W_{out}(k)$ and $W_L(k)$ can be obtained from the work modes 1 and 2; according to the energy balance control principle shown by the formula (1), in order to keep the energy balance, there is the following formula:

$$W_{in}(k) = W_L(k) + W_{out}(k) \quad (3)$$

$$\Downarrow$$

$$\int_0^{T_s} Ei_L(k)dt + \int_{T_{on}}^{T_s} Ei_o(k)dt = u_{ref}i_o(k)T_s + u_L(k)i_L(k)T_s$$

$$\Downarrow$$

$$\int_0^{T_s} E(i_L(k) - i_o(k))dt = (u_{ref} - E)i_o(k)T_s + u_L(k)i_L(k)T_s$$

$(u_{ref}-E)i_o(k)T_s + u_L(k)i_L(k)T_s$ is represented by $W_{dm}$, that is:

$$W_{dm} = (u_{ref}-E)i_o(k)T_s + u_L(k)i_L(k)T_s$$

Therefore, in order to keep the energy balance, the switch $S_1$ is on in the $k^{th}$ switching cycle, and the DC power supply inputs energy into the circuit until $$\int_0^{T_s} E(i_L(k)-i_o(k))dt \geq W_{dm}$$

The energy balance control principle realized by the Boost converter through the energy balance controller is similar to the energy balance control principle of the Buck converter. The energy balance control method implemented with the above energy balance controller will be further described with reference to FIGS. 8a-8d, FIGS. 9a-9d and FIGS. 10a-10d.

Simulation parameters of the Boost circuit: L=500 uH, C=800 uF, $f_s$=10 KHz, E=20 V, $u_{ref}$=30 V. In order to prove the advantages of the energy balance controller of this example, a PI controller and a single-cycle controller are selected for comparison.

In FIGS. 8a-8d can be seen the dynamic response of the output voltage of the Boost converter during the input voltage jump 20V→17V→21V; wherein it can be known by comparing the output voltage waveform of the Boost converter based on the energy balance control with the output voltage waveform of the Boost converter based on the PI control that, when the input voltage jumps, the output voltage of the Boost converter based on the energy balance control has no obvious dynamic adjustment process, indicating that the energy balance control has the capacity of completely inhibiting interference or jump of the input voltage. While the Boost converter based on the PI control has overshoot greater than 8 V when the input voltage jumps downward (20V→17V), and has the dynamic response time longer than 90 ms; it has overshoot greater than 11 V when the input voltage jumps upward (17 V→21 V), and has the dynamic response time longer than 75 ms; obviously, the energy balance control has stronger capacity of inhibiting interference and even jump of the input voltage.

Figure 9A:
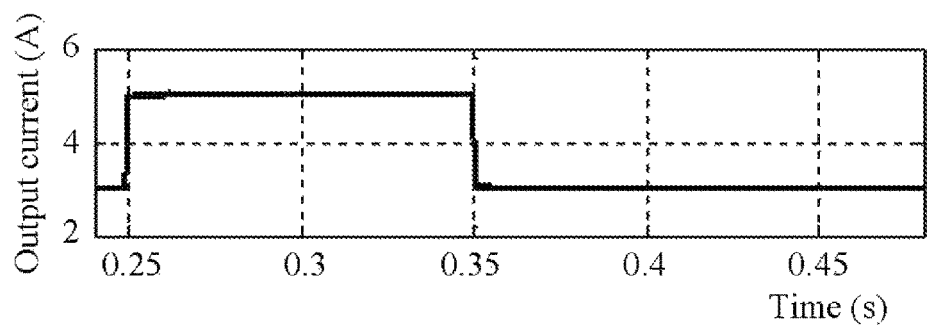
FIG. 9a is a waveform diagram of the Boost converter that makes the load current jump by changing the load resistance 6Ω→10Ω→6Ω.
Figure 9B:
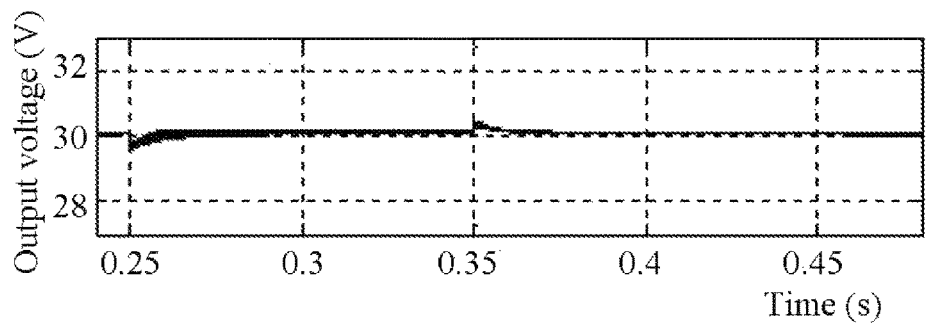
FIG. 9b is a waveform diagram of the output terminal a voltage during the load current jump of the Boost converter based on the energy balance control.
Figure 9C:
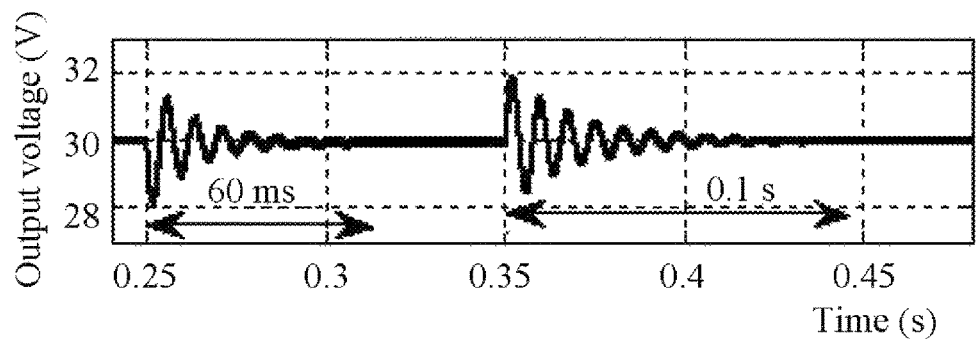
FIG. 9c is a waveform diagram of the output voltage during the load current jump of the Boost converter based on the single-cycle control.
Figure 9D:
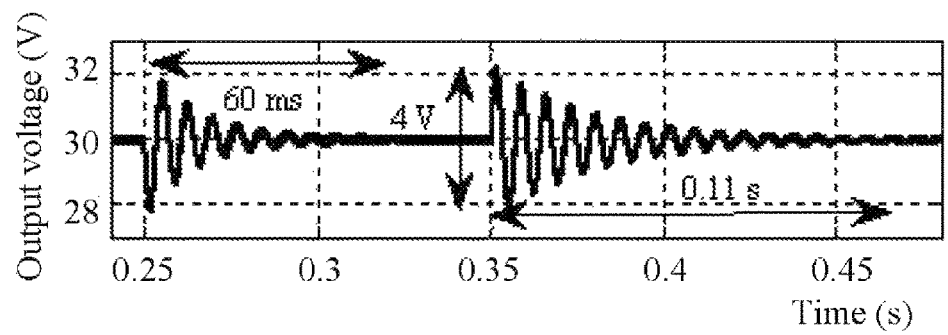
FIG. 9d is a waveform diagram of the output voltage during the load current jump of the Boost converter based on the PI control.
Figure 10A:
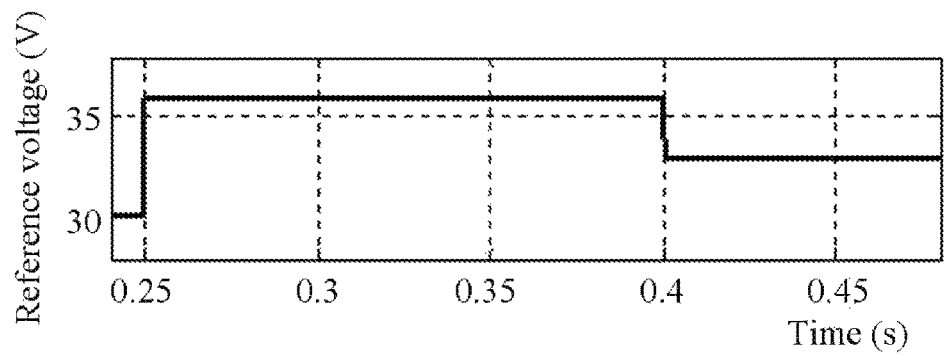
FIG. 10a is a waveform diagram of the given voltage jump 30V→34V→32V of the Boost converter.
Figure 10B:
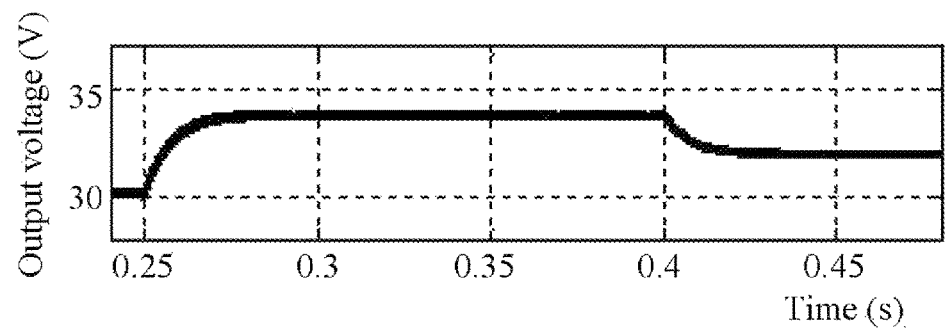
FIG. 10b is a waveform diagram of the output voltage based on the energy balance control during the given voltage jump of the Boost converter.
Figure 10C:
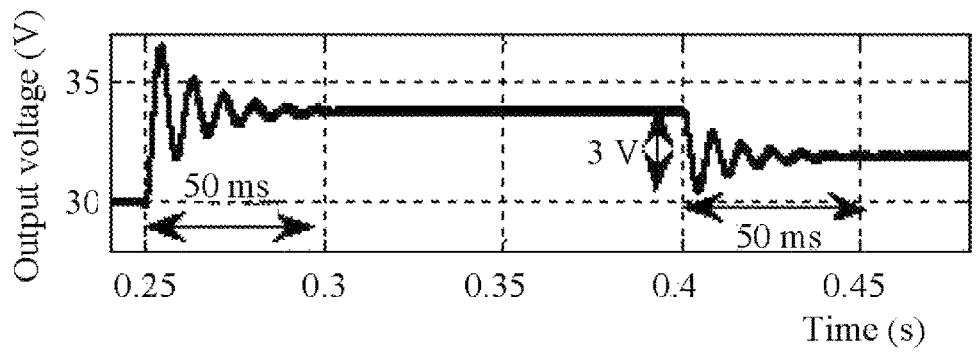
FIG. 10c is a waveform diagram of the output voltage based on the single-cycle control during the given voltage jump of the Boost converter.
Figure 10D:
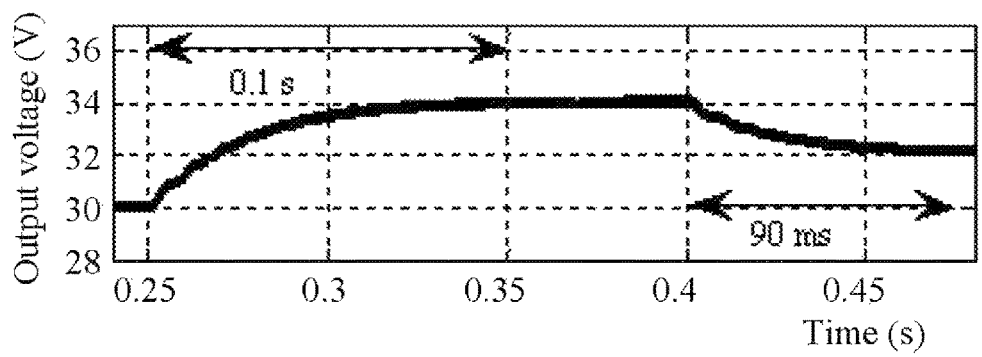
FIG. 10d is a waveform diagram of the output voltage based on the PI control during the given voltage jump of the Boost converter.

In FIGS. 9a-9d can be seen the dynamic response of the Boost converter when the load current jumps (realized by changing the load resistance 6Ω→10Ω→6Ω); when the load current jumps, the Boost converter based on the energy balance control, compared with the Boost converter based on the PI control, has the output voltage overshoot reduced from 3 V to 0.5 V, and also has the greatly reduced dynamic response time; while the output voltage response of the Boost converter based on the single-cycle control has the dynamic response time of 60 ms and overshoot up to 3 V; obviously, the single-cycle control does not improve the dynamic response capacity of the output voltage to the load jump; the simulation results in FIGS. 9b-9d show that, the single-cycle control, being the same with the PI control, has weak capacity of inhibiting the load current jump, while the energy balance control has strong capacity of inhibiting interference and even jump of the load current.

In order to verify the capacity of the output voltage following the given voltage, In FIGS. 10a-10d can be seen the dynamic response of the Boost converter when the given voltage jumps (30V→34V→32V); when the given voltage jumps, the output voltage of the Buck converter based on the energy balance control can quickly follow the given voltage to change, which indicates that the energy balance control has the strong capacity of following the given voltage; while the Boost converter based on the single-cycle control, although being able to follow the given voltage in the short period of time, has very great overshoot; when the given voltage jumps, the Boost converter based on the PI control needs the dynamic adjustment time up to 0.1 ms to reach the new stable state.

In addition, the Buck-Boost converter can likewise deduce the control equation through the similar steps based on the energy balance control principle, and can control the converter through the calculation unit and the reset integrator. Also, the DC-DC converter can not only achieve the function of boosting and reducing the DC voltage, but also achieve such functions as DC-AC and AC-DC conversion through various combination, thus making the above-mentioned energy balance control method still applicable to the DC-AC converter and the AC-DC converter.

The examples of the present invention simply take the Buck converter and the Boost converter as an example. However, the scope of protection of the present invention is not limited thereto. Equivalent substitution or alteration made by any of those skilled in the art within the scope disclosed by the present invention according to the technical solution of the present invention and the inventive concept thereof all falls within the scope of protection of the present invention.

What is claimed is:

1. An energy balance controller of an electronic power converter, wherein: the energy balance controller comprises a detection unit, a calculation unit and a reset integral module; the reset integral module includes a reset integrator, a comparator and an RS flip-flop; the input terminals of the calculation unit and the reset integrator are connected to an output terminal of the detection unit, respectively; an output terminal of the calculation unit is connected to one input terminal of the comparator, and an output terminal of a reset integrator is connected to the other input terminal of the comparator; an output terminal of the comparator is connected to the reset terminal of the RS flip-flop; a $\overline{Q}$ terminal of the RS flip-flop is connected to the reset integrator, and a Q terminal of the RS flip-flop is used for controlling a switching device of the converter to switch on or off; wherein the detection unit is used in the detection unit for detecting an inductor current, an input voltage and an output current of the converter, sending an inductor current signal and an output current signal to the calculation unit, and sending the inductor current signal and an input voltage signal to the reset integrator;

the calculation unit is used for receiving the inductor current signal and the output current signal of the detection unit, calculating the sum of an energy stored in an inductor and an output energy according to the inductor current, the output current and given a voltage, and sending a calculation result to the one input terminal of the comparator;

the reset integrator is used for receiving the inductor current signal and the input voltage signal of the detection unit, integrating a product of the inductor current and the input voltage, and sending an integral result to the other input terminal of the comparator; and the comparator is used for comparing and judging the output results of the reset integrator and the calculation unit, and sending a judgment result to the reset terminal of the RS flip-flop.

2. The energy balance controller of the electronic power converter according to claim 1, wherein: the detection unit comprises:

a current sensor, used for detecting the inductor current and the output current of the converter; and a voltage sensor, used for detecting the input voltage of the converter.

3. The energy balance controller of the electronic power converter according to claim 1, wherein: the converter is a DC-DC converter, an AC-DC converter or a DC-AC converter.

4. An energy balance control method of the electronic power converter according to the energy balance controller of claim 1, wherein: the energy balance control method comprises the following steps:

1) the detection unit detects the inductor current, the input voltage and the output current of the converter, sends the inductor current signal and the output current signal to the calculation unit, and sends the inductor current signal and the input voltage signal to the reset integrator;

2) the calculation unit calculates a sum of the energy stored in the inductor and the output energy according to the energy balance control method by making use of the inductor current, the output current and the given voltage, and sends the calculation result to the one input terminal of the comparator, with the integral result of the reset integrator at this point being zero;

3) when a clock pulse arrives, the clock pulse triggers the RS flip-flop and controls the switching device of the converter to switch on through the Q terminal of the RS flip-flop; the reset integrator integrates the product of the inductor current and the input voltage, and sends the integral result to the other input terminal of the comparator; and 4) the comparator compares and judges the output results of the reset integrator and the calculation unit; when the output result of the reset integrator is greater than or equal to the output result of the calculation unit, the judgment result is sent to the reset terminal of the RS flip-flop, and the $\overline{Q}$ terminal of the RS flip-flop generates a reset pulse signal to reset the reset integrator; and the Q terminal of the RS flip-flop is used to control the switching device of the converter to switch off, and the output result of the reset integrator is kept at zero until a next clock pulse arrives.

5. The energy balance control method of the electronic power converter according to claim 4, wherein: the energy balance control method is shown by the following formula:

$$W_{in}=W_L+W_{out}$$

wherein $W_{in}$ is an energy inputted into a converter circuit, $W_L$ is the energy stored in an inductor L, and $W_{out}$ is an energy outputted by the converter circuit.

6. The energy balance controller of the electronic power converter according to claim 2, wherein: the converter is a DC-DC converter, an AC-DC converter or a DC-AC converter.

* * * * *